United States Patent Office 3,178,487
Patented Apr. 13, 1965

3,178,487
PROCESS FOR REMOVING ACETYLENICALLY UNSATURATED HYDROCARBONS FROM GAS MIXTURES
Gustav Daendliker, Birsfelden, Switzerland, assignor to Ciba Limited, Basel, Switzerland, a company of Switzerland
No Drawing. Filed Jan. 29, 1962, Ser. No. 169,599
Claims priority, application Switzerland, Jan. 31, 1961, 1,150/61
6 Claims. (Cl. 260—677)

The present invention provides a process for removing acetylenically unsaturated hydrocarbons from gas mixtures containing in addition to said hydrocarbons at least one of the following substances: Nitrogen, hydrogen, carbon dioxide, carbon monoxide, helium, argon, neon, krypton, saturated aliphatic hydrocarbons and aliphatic hydrocarbons that are free from triple bonds and contain at least one double bond, wherein the gas mixture is introduced, advantageously under a pressure of 100 to 4000 mm. Hg, into an inert organic solvent containing a halide or oxyhalide of niobium, tantalum, tungsten or molybdenum in a dispersed state, and the issuing gas mixture, which has a lower concentration of acetylenically unsaturated compounds, is, if desired, once more introduced into the solvent.

The gas mixtures from which the acetylenically unsaturated hydrocarbons are removed by the present process may be of natural origin or they may have been formed in the course of an industrial manufacturing, conversion or mixing process. Gas mixtures suitable for treatment according to the invention contain in addition to the acetylenically unsaturated hydrocarbons also one or more than one of the following constituents:

Nitrogen, hydrogen, carbon dioxide, carbon monoxide, rare gases, aliphatic or alicyclic hydrocarbons which contain 2 to 8 carbon atoms and may be saturated or may contain at least one carbon-to-carbon double bond but must be free from carbon-to-carbon triple bonds.

The term "acetylenically unsaturated hydrocarbons," which can be separated from mixtures thereof with other gaseous substances, refers above all to acetylene and its homologues containing 2 to 6 carbon atoms, for example methylacetylene, ethylacetylene, dimethylacetylene, vinylacetylene, diacetylene and divinylacetylene.

The present process is, for example, outstandingly suitable for the production of acetylene-free olefines which are used with advantage for the manufacture of polymers and olefine polyepoxides. As is known, the purification of olefines containing 2 to 8 carbon atoms, for example ethylene, propylene, butylene, butadiene, isobutylene, hexylene and the like, which are obtained in industry in the form of mixtures which always contain also a certain proportion of acetylenically unsaturated hydrocarbons, is a weighty problem.

Different methods have already been proposed and used for removing acetylenically unsaturated hydrocarbons from such industrial olefine mixtures. According to one known method, for example, the gas mixture concerned is passed through a polar solvent, preferably dimethylformamide or dimethylsulfoxide, part of the acetylene content being absorbed by the solvent. However, said process has—apart from the fact that only a limited selection of suitable solvents is available for it—the considerable disadvantage that the solvent relatively soon loses its capacity to dissolve the acetylenically unsaturated compounds so that after a short time the reaction must be discontinued and the solvent regenerated by heating or aeration which involves a considerable investment of power. The selective absorption which the known process offers is incomplete, that is to say that, apart from the alkines, a substantial proportion of those products is absorbed from which the acetylene content is to be removed. Moreover, these constituents, whose absorption is not desired, can at best be recovered only to a minor extent in the course of the regeneration of the polar solvent.

Surprisingly, the present process overcomes the aforementioned shortcomings of the known process. In the first place, the separation operation can be prolonged over a much longer period than is possible with the known process of the selective absorption of the acetylenically unsaturated compounds by certain polar solvents. When a suitable installation is used, it is even possible to perform the separation continuously. It is another advantage of the present process that the selection of suitable organic solvents is not limited to a few compounds, for example dimethyl formamide or dimethyl sulfoxide, but a large variety of inert aliphatic or isocyclic organic compounds preferably free from oxygen may be used. There is used a solvent boiling above the temperature at which the acetylenically unsaturated compound is absorbed. As examples of particularly suitable solvents there may be mentioned: Benzene, toluene, ortho-, meta- and para-xylene, methylcyclohexan, ethylene tetrachloride, carbon tetrachloride, chloroform, and mixtures of said compounds, as well as saturated aliphatic hydrocarbons such, for example, as are present in the form of mixtures in the commercial product "Shellsol T" (trademark of Shell Chem. Corp.), or mixtures of such aliphatic hydrocarbons with isocyclic compounds.

As a metal compound which as sole ingredient according to the invention is to be dispersed in said organic solvent, there may be mentioned a volatile compound containing halogen of the Lewis acid type derived from the metals niobium, tantalum, tungsten or molybdenum.

With special advantage the following chlorides and oxychlorides can be used in the present process: $NbCl_5$, $NbF_5$, $NbOCl_3$, $NbBr_5$, $TaCl_5$, $TaBr_5$, $TaF_5$, $WCl_6$, $WOCl_4$, $MoCl_5$ and $MoOCl_3$. The term "sole ingredient" includes also adducts or higher complexes of the metal compounds such, for example, as the adduct of a phosphorous oxychloride with a halide of a metal of sub-group V, of the Periodic Table more especially the compound $NbCl_5.POCl_3$. Very suitable are also adducts of a primary, secondary or tertiary amine with a halide of a metal of sub-group V or VI of the Periodic Table, for example the compound $NbCl_5.NH_2$—$C(CH_3)_3$.

The selected metal compound is dissolved or dispersed in the organic solvent, advantageously with the aid of mechanical appliances, for example an agitator or a vibratory mixer and, if the metal compound is sensitive towards water, with exclusion of water, including atmospheric moisture. The simplest way to bring the gas current into contact with the solvent is to introduce it into the solvent in which the metal compound has been dispersed. The progressive absorption of the acetylenically unsaturated hydrocarbons is noticeable by an increase in volume of the solvent. If the selected metal compound does not dissolve in the organic solvent, it may under certain conditions be of advantage to keep it suspended by mechanical means during the whole course of the absorption.

The present process can be performed under a pressure of 100 to 4000 mm. Hg or advantageously under atmospheric pressure and at room temperature, though the temperature may also be varied within relatively wide limits. Good results are achieved, inter alia, at temperatures varying from −30° C. to 200° C., depending on the boiling temperature of the individual solvent. It has proved particularly advantageous to use a temperature ranging from 20° C. to 110° C. when the selected solvent is, for example, benzene, a xylene or methylcyclohexane.

The ratio of the organic solvent in which the metal compound is dispersed to the amount of gas mixture to be separated and brought as a whole into contact with the solvent, may be varied within relatively wide limits. It is of advantage that, even when a minor amount of solvent is used, a surprisingly large amount of acetylene can be removed from the gas mixture. Thus, the efficacy of the solvent+metal compound mixture is not limited by the relatively small amount of acetylenically unsaturated hydrocarbons that can be absorbed by the solvent by absorption alone but, in fact, the presence of the metal compound in the solvent enables a much larger proportion of the acetylenically unsaturated hydrocarbons to be absorbed and separated from the other constituents of the gas mixture, for example from the olefines, than is possible by the known process of the selective absorption by a polar solvent.

Another and very significant advantage of the present process is that it is possible to remove the acetylenically unsaturated hydrocarbons very extensively or substantially completely from the gas mixture concerned. Thus, for example, it is possible to remove the acetylene present in a mixture of ethylene and acetylene to an extent such that the radical can no longer be detected by a sensitive gas chromatograph, that is to say that acetylene can be removed substantially completely from the mixture.

As mentioned above, the absorption of the acetylene compounds by the organic solvent containing the metal compound is accompanied by an increase in volume of the absorption liquor. In the absorption chamber additional amounts of preferably liquid organic products, in admixture with the organic solvent containing the metal compound accumulate.

These liquid products, obtained as "by-products" by the absorption operation, have surprisingly valuable properties, for example as solvents. Thus, the present process offers the further advantage that in the absorption chamber itself valuable secondary products are obtained in addition to the constituents of the gas mixture freed from its acetylene constituent which latter escapes from the absorption liquor.

The present process is particularly valuable when the solvent used for dispersing the metal compound and the organic compounds resulting from the conversion of the acetylenically unsaturated hydrocarbon, are easy to separate by distillation, or when the organic solvent used and the conversion products arising from the acetylenically unsaturated hydrocarbons form a uniform phase which can be used for industrial purposes, for example as solvent, without requiring previous separation.

The fact that in the absorption chamber such industrially useful "by-products" are additionally obtained increases, of course, the economy of the separation process of the invention.

The effective and continuous separation of the acetylenically unsaturated compounds from the gas mixture can be performed by the present process without interruption over a surprisingly long period, for example for several days. If the absorption of the acetylene compounds should slow down or cease altogether, it suffices in many cases to add to the solvent a small fresh supply of the metal compound concerned in order to reactivate the process. When the set-up (supply device) is suitably arranged, it is likewise possible to prevent an interruption in the separation process. It is thus possible to perform the new process continuously, if desired.

In many cases it is particularly advantageous to perform the exchange between the gas mixture to be separated and the organic solvent containing the metal compound according to the counter-current principle or as a cyclic process.

The amount of metal compound to be used in the present process may be surprisingly small in most cases and is 2 to 40 grams, preferably 10 to 30 grams, per liter of solvent. Referred to the acetylene compound to be absorbed, the amount of metal compound required is 1 gram per 0.5 to 70 grams of the acetylene compound involved.

The present process is equally suitable for separating gas mixtures containing only a small share (for example 1% by weight or less) of the acetylenically unsaturated hydrocarbons ond for separating gas mixtures containing a larger proportion of acetylenically unsaturated hydrocarbons (for example 10% by weight or more).

The new process is likewise suitable for removing the acetylenically unsaturated hydrocarbons from such gas mixtures as are obtained by thermal scission or partial oxidation of mixtures containing hydrocarbons.

The following examples illustrate the invention.

EXAMPLE 1

5 grams of niobium pentachloride are suspended in each of two flasks arranged one behind the other, having a capacity of 1 liter and each containing 350 cc. of methyl-cyclohexane, and kept in dispersion with the aid of a vibrating mixer. Through the liquids contained in the two flasks there is passed a gas mixture consisting of 14% by weight of acetylene (determined as the Cu-acetylide) and 86% by weight of nitrogen, at a flow rate of 700 cc. per minute, the liquids in the two flasks having a temperature of 50° C. After thus having passed the gas through for 20 minutes, the gas current which continues to issue constantly from the second flask is introduced into two spiral washing bottles arranged one behind the other and filled with ammoniacal $Cu_2Cl_2$ solution. When the precipitated Cu-acetylide is weighed, it is found that the issuing gas mixture contains 0.6% by weight of acetylene.

EXAMPLE 2

(a)

5.5 grams of niobium pentachloride are suspended in each of 2 flasks arranged one behind the other, of 1 liter capacity and each filled with 400 cc. of methyl-cyclohexane, and the dispersion is maintained by means of a vibrating mixer. Through the liquids in the two flasks there is passed a gas mixture consisting of 4.5% by weight of acetylene (determined by gas chromatography as described below) and 95.5% by weight of ethylene at a flow rate of 570 cc. per minute, the liquids in the two flasks having a temperature of 64° C. The gas issuing from the second flask is then introduced into a washing bottle filled with paraffin oil. From the connection between the second flask and the washing bottle a branch leads to an exchangeable steel flask of 100 cc. capacity which is equipped with both an inlet and outlet opening which can be closed. From this steel flask the amounts of gas required for the analysis are taken. When the gas current has passed for 13 minutes through the absorption flasks, the connection between the second flask and the washing bottle is interrupted and the gas current, which continues to issue constantly, is passed for 5 minutes through the steel flask. After this period of 5 minutes the steel flask is closed at both ends. The measuring of the acetylene content in the gas collected in the steel flask was carried out with the aid of the research gas chromatograph made by Messrs. Becker, Delft, under the conditions described below:

Column: Stainless steel, 2 m. long, cross-sectional area 6 x 8 mm.
Column filling: Activated alumina according to Brockmann, activity 2, corresponding to a water content of 3%.
Temperature: 22° C.
Carrier gas: Helium
Rate of gas flow: 54 cc. per minute
Pressure in column: 884 mm. Hg
Detector: Catharometer Gow Mac, 4 tungsten wires
Cell current: 200 mamp.
Period of retention:
 Ethylene—2.3 minutes
 Acetylene—7.4 minutes Minimum amount of gas detectable with the gas chromatograph: 0.04% by weight.

This determination revealed that the gas collected in the steel flask contained less than 0.1% by weight of acetylene.

Alternatively the collection of a specific amount of gas in the steel flask for analytical purposes may be achieved by evacuating the flask through the exit opening and, after the requisite amount of gas has been admitted, closing the inlet opening. In a manner similar to that described under (a) the following gas mixtures were separated and analyzsed:

(b)

Gas mixture
    Acetylene—7.4% by weight
    Methane—92.6% by weight
Metal compound: $NbCl_5$, 8.2 grams in each of the two flasks
Solvent: Methylcyclohexane, 400 cc. in each of the two flasks
Temperature: about 580° C. in each of the two flasks
Flow rate: 640 cc. per minute
Content of acetylene in the gas leaving the absorption apparatus:

| Minutes after beginning the injection | Percent by weight |
|---|---|
| 50 | 0.1 |
| 90 | 0.3 |
| 150 | 0.3 |

(c)

Gas mixture:
    Acetylene—4.5% by weight
    Propylene—95.5% by weight
Metal compound: $NbCl_5$, 8. grams per flask
Solvent: Methylcyclohexane, 400 cc. per flask
Temperature: about 61° C. in each of the two flasks
Flow rate: 510 cc. per minute.
Content of acetylene in the gas leaving the absorption apparatus:

| Minutes after beginning the injection | Percent by weight |
|---|---|
| 75 | 0.1 |
| 350 | 0.1 |
| 415 | 0.1 |

EXAMPLE 3

A vertical tube of 50 cm. length and 5 cm. diameter, having a gas inlet socket at the bottom end and a gas discharge socket at the top end, equipped with a vibrating mixer along its vertical axis which carries 5 equidistant perforated plates of 45 mm. diameter (multi-plate vibrator) is charged with 750 ml. of meta-xylene and 10 grams of niobium pentachloride. The vibratory mixer ensures very good dispersion and partial dissolution of the niobium pentachloride in the solvent. A gas mixture consisting of 3.4% by weight of acetylene and 96.6% by weight of ethylene (determined by chromatography as described in Example 2 under (a)) is injected through the gas inlet socket at the bottom end of the tube, is finely dispersed by the multi-plate vibrator, and ascends through the liquid column.

Temperature of the liquid _____ 24 to 27° C.
Flow rate _____ 550 cc. per minute.

From the gas outlet socket at the top end of the tube the issuing gas is conveyed (as described in Example 2 under (a)) either into a washing bottle containing paraffin oil or, for analytical purposes, collected in a steel flask of 100 cc. capacity. The content of acetylene in the issuing gas is determined by means of the gas chromatograph as described in Example 2 under (a).

The following results are obtained:

Content of acetylene in the gas leaving the absorption apparatus:

| Minutes after beginning the injection | Percent by weight |
|---|---|
| 205 | Below 0.04. |
| 395 | Below 0.04. |
| 550 | Below 0.04. |

In view of the fact that an amount of gas below 0.04% by volume is the minimum sensitivity of the gas chromatographic method used, it may be stated that by the separation method described above acetylene is substantially completely separated from ethylene.

EXAMPLE 4

5 grams of tantalum pentachloride each are suspended in 2 flasks of ½ liter capacity each, arranged one behind the other, and each charged with 250 cc. of meta-xylene, and kept suspended by means of a vibrating mixer. Through the liquids in the two flasks there is passed a gas mixture consisting of 12% by weight of acetylene (determined as the Cu-acetylide) and 88% by weight of hydrogen, at a flow rate of 500 cc. per minute, the liquids in the two flasks having a temperature of 85° C. After the gas current has been so passed for 20 minutes, the gas current further issuing constantly from the second flask is conveyed into two spiral washing bottles which are arranged one behind the other and are filled with ammoniacal $Cu_2Cl_2$ solution. Determination of the Cu-acetylide so precipitated reveals that the issuing gas mixture contains 0.4% by weight of acetylene.

EXAMPLE 5

As starting mixture a commercial product of Dow Chemical Company, Midland, Michigan, U.S.A., called Mapp was used which is substantially composed of propadiene (allene), propine (methylacetylene) and propane. The composition of the fraction used as starting material and the products was determined by gas chromatography, under the following conditions:

Column _____ As described in Example 2.
Carrier gas _____ Helium.
Rate of gas flow _____ 60 cc. per minute.
Pressure in column _____ 1050 mm. Hg.
Temperature _____ 35° C.
Period of retention:
    Propane _____ 4.4 minutes.
    Propadiene _____ 11.4 minutes.
    Propine _____ 56.4 minutes.

As reference substance pure propine (Matheson Comp. Inc., East Rutherford, N.J., U.S.A.) and propadiene (Columbia Organic Chemicals Co., Columbia, S.C., U.S.A.) were used. The starting mixture was composed as follows:

Percent by volume
Propane _____ 23.3
Propadiene _____ 44.0
Propine _____ 29.0

(a) 300 cc. of methylcyclohexane and 10 grams of niobium pentachloride are put into a round-bottomed flask of 1 liter capacity fitted with a gas inlet tube, thermometer, reflux condenser and vibromixer. A current of the gas mixture is introduced with vigorous stirring at room temperature and at a flow rate of 2.5 grams per minute by evaporation from a cooled receptacle in the reaction flask. After 3 minutes the catalyst begins to change color, and after 5 minutes complete absorption of the propine can be observed, which is evident from a considerable increase in temperature. The temperature is maintained at 30 to 35° C. by cooling. The unreacted gas escapes by way of the reflux condenser and flows either through a small steel container from which samples for analysis are taken, or is condensed in a cooled receptacle. After 7 minutes, counting from the beginning of the absorption, and after 50 minutes a gas sample is taken, the following composition being found:

|  | After 7 minutes, percent by volume | After 50 minutes, percent by volume |
|---|---|---|
| Propane | 60.6 | 52.3 |
| Propadiene | 36.1 | 44.9 |
| Propine | 0.9 | 0.4 |

The reaction is then interrupted without the catalyst being exhausted.

(b) Substantially the same apparatus is used as described under (a). Instead of a flask of 1 liter capacity, a flask of 500 cc. capacity is used.

200 cc. of toluene, 10.8 grams of niobium pentachloride and 2.92 grams of tertiary butylamine are heated with vigorous stirring for 20 minutes at 100° C., a homogeneous, brown suspension being formed. The reaction mass is then cooled to 50° C. and the starting mixture of propane, propadiene and propine in gaseous form is introduced at a flow rate of about 2 grams per minute. Vigorous absorption sets in immediately, accompanied by an increase in temperature and a gradual change in color of the catalyst. The temperature is maintained at 55 to 60° C. by cooling. Gas samples are taken after 60 minutes which have the following composition:

Percent by volume
Propane _____ 38.1
Propadiene _____ 50.8
Propine _____ 6.7

After the second sample has been taken, the reaction is interrupted without the catalyst being exhausted.

What is claimed is:

1. A process for continuously removing acetylenically unsaturated aliphatic hydrocarbons containing 2 to 6 carbon atoms from gas mixtures that contain in addition to said hydrocarbons olefinic hydrocarbons free from triple bonds, in which process the gas mixture is introduced under a pressure of 100 to 4000 mm. Hg into an inert organic solvent, which contains per liter as sole ingredient 2 to 40 grams of a halide of the Lewis acid type selected from the group consisting of niobium, tantalum, tungsten and molybdenum, and whereby the acetylenically unsaturated hydrocarbons are selectively absorbed while the non-absorbed portion of the gas passes unchanged through the solution.

2. A process for continuously removing acetylenically unsaturated aliphatic hydrocarbons containing 2 to 6 carbon atoms from gas mixtures that contain in addition to said hydrocarbons olefinic hydrocarbons free from triple bonds, in which process the gas mixture is introduced under a pressure of 100 to 4000 mm. Hg into an inert organic solvent, which contains per liter as sole ingredient 2 to 40 grams of a halide of the Lewis acid type niobium, and whereby the acetylenically unsaturated hydrocarbons are selectively absorbed while the non-absorbed portion of the gas passes unchanged through the solution.

3. A process for continuously removing acetylenically unsaturated aliphatic hydrocarbon containing 2 to 6 carbon atoms from gas mixtures that contain in addition to said hydrocarbons olefinic hydrocarbons free from triple bonds, in which process the gas mixture is introduced under a pressure of 100 to 4000 mm. Hg into an inert organic solvent, which contains per liter as sole ingredient 2 to 40 grams of niobium pentachloride and whereby the acetylenically unsaturated hydrocarbons are selectively absorbed while the non-absorbed portion of the gas passes unchanged through the solution.

4. A process for continuously removing acetylenically unsaturated aliphatic hydrocarbons containing 2 to 6 carbon atoms from gas mixtures that contain in addition to said hydrocarbons mixtures of saturated hydrocarbons and olefinic hydrocarbons free from triple bonds, in which process the gas mixture is introduced under a pressure of 100 to 4000 mm. Hg into an inert organic solvent, which contains per liter as sole ingredient 2 to 40 grams of halide of the Lewis acid type selected from the group consisting of niobium, tantalum, tungsten and molybdenum, and whereby the acetylenically unsaturated hydrocarbons are selectively absorbed while the non-absorbed portion of the gas passed unchanged through the solution.

5. A process for continuously removing acetylenically unsaturated aliphatic hydrocarbons containing 2 to 6 carbon atoms from gas mixtures that contain in addition to said hydrocarbons mixtures of saturated hydrocarbons and olefinic hydrocarbons free from triple bonds, in which process the gas mixture is introduced under a pressure of 100 to 4000 mm. Hg into an inert organic solvent, which contains per liter as sole ingredient 2 to 40 grams of a halide of the Lewis acid type niobium, and whereby the acetylenically unsaturated hydrocarbons are selectively absorbed while the non-absorbed portion of the gas passes unchanged through the solution.

6. A process for continuously removing acetylenically unsaturated aliphatic hydrocarbon containing 2 to 6 carbon atoms from gas mixtures that contain in addition to said hydrocarbons mixtures of saturated hydrocarbons and olefinic hydrocarbons free from triple bonds, in which process the gas mixture is introduced under a pressure of 100 to 4000 mm. Hg into an inert organic solvent, which contains per liter as sole ingredient 2 to 40 grams of niobium pentachloride and whereby the acetylenically unsaturated hydrocarbons are selectively absorbed while the non-absorbed portion of the gas passes unchanged through the solution.

References Cited by the Examiner
UNITED STATES PATENTS

| 2,829,182 | 4/58 | King _____ 260—677 |
| 2,990,434 | 6/61 | Smith _____ 260—673.5 |
| 3,125,610 | 3/64 | Daendliker et al. _____ 260—673 |

ALPHONSO D. SULLIVAN, Primary Examiner.